(12) United States Patent
Pierson et al.

(10) Patent No.: US 11,683,071 B2
(45) Date of Patent: **\*Jun. 20, 2023**

(54) APPARATUS FOR SECURELY CONFIGURING A TARGET DEVICE

(71) Applicant: THE TRUSTEES OF DARTMOUTH COLLEGE, Hanover, NH (US)

(72) Inventors: Timothy J. Pierson, Hanover, NH (US); Xiaohui Liang, West Lebanon, NH (US); Ronald Peterson, Brattleboro, VT (US); David Kotz, Lyme, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,451

(22) Filed: Jan. 20, 2020

(65) Prior Publication Data

US 2020/0169295 A1   May 28, 2020

Related U.S. Application Data

(63) Continuation of application No. 15/739,122, filed as application No. PCT/US2016/039009 on Jun. 23, 2016, now Pat. No. 10,574,298.

(60) Provisional application No. 62/183,411, filed on Jun. 23, 2015.

(51) Int. Cl.
| | |
|---|---|
| *H04B 5/00* | (2006.01) |
| *H04B 7/06* | (2006.01) |
| *H04W 76/15* | (2018.01) |
| *H04B 17/318* | (2015.01) |
| *H04L 67/12* | (2022.01) |

(52) U.S. Cl.
CPC ......... *H04B 5/0031* (2013.01); *H04B 7/0602* (2013.01); *H04B 17/318* (2015.01); *H04W 76/15* (2018.02); *H04L 67/12* (2013.01)

(58) Field of Classification Search
CPC .. H04B 5/0031; H04B 7/0602; H04B 17/318; H04W 76/15; H04L 67/12
See application file for complete search history.

(56) References Cited

U.S. PATENT DOCUMENTS

| | | | | |
|---|---|---|---|---|
| 5,918,189 | A * | 6/1999 | Kivela | H04M 1/0262 343/702 |
| 2009/0172491 | A1 | 7/2009 | Chen | |
| 2010/0068996 | A1* | 3/2010 | Haartsen | H04B 5/0025 455/41.1 |
| 2010/0210207 | A1 | 8/2010 | Goto et al. | |
| 2011/0276802 | A1 | 11/2011 | Roberts et al. | |

(Continued)

*Primary Examiner* — Yuwen Pan
*Assistant Examiner* — Fatuma G Sherif
(74) *Attorney, Agent, or Firm* — Cozen O'Connor

(57) ABSTRACT

Apparatus and method securely transfer first data from a source device to a target device. A wireless signal having (a) a higher speed channel conveying second data and (b) a lower speed channel conveying the first data is transmitted. The lower speed channel is formed by selectively transmitting the wireless signal from one of a first and second antennae of the source device based upon the first data. The first and second antenna are positioned a fixed distance apart and the target device uses a received signal strength indication (RSSI) of the first signal to decode the lower speed channel and receive the first data.

15 Claims, 10 Drawing Sheets

(56) References Cited

U.S. PATENT DOCUMENTS

| | | |
|---|---|---|
| 2012/0098643 A1* | 4/2012 | Gunther .............. G06K 7/10435 340/10.1 |
| 2012/0214402 A1 | 8/2012 | Shany et al. |
| 2012/0268308 A1 | 10/2012 | Tuttle |
| 2013/0307727 A1 | 11/2013 | He et al. |
| 2013/0308554 A1 | 11/2013 | Ngai et al. |
| 2014/0022125 A1 | 1/2014 | Zhu et al. |
| 2014/0095673 A1 | 4/2014 | Mao et al. |
| 2014/0141714 A1 | 5/2014 | Ghosh et al. |
| 2015/0242665 A1* | 8/2015 | Antonescu .......... G06K 19/0724 340/8.1 |
| 2015/0349858 A1* | 12/2015 | Sezginer ................... H04L 1/06 375/267 |

* cited by examiner

APPARATUS FOR SECURELY CONFIGURING A TARGET DEVICE

CROSS-REFERENCE TO RELATED APPLICATIONS

This application is a Continuation of U.S. Ser. No. 15,739,122 filed Dec. 21, 2017, which is a 35 U.S.C. § 371 filing of International Application No. PCT/US2016/039009, filed Jun. 23, 2016, which claims the benefit of priority to U.S. Patent Application Ser. No. 62/183,411, titled "Apparatus for Securely Configuring a Target Device and Associated Methods", filed Jun. 23, 2015, each of which is incorporated herein by reference in its entirety.

U.S. GOVERNMENT RIGHTS

This invention was made with government support under grant number CNS1329686 awarded by the National Science Foundation. The government has certain rights in the invention.

BACKGROUND

Nearly every setting is increasingly populated with wireless and mobile devices—whether appliances in a home, medical devices in a health clinic, sensors in an industrial setting, or devices in an office or school. There are three fundamental operations when bringing a new device into any of these settings: (1) to configure the device to join the wireless local-area network, (2) to partner the device with other nearby devices so they can work together, and (3) to configure the device so it connects to any relevant individual or organizational account in the cloud.

Recently, predictions have been made of how the Internet of Things (IoT) is poised to make billions of everyday objects "smart" by adding wireless communication capabilities. The dream is that networks of these newly connection-enabled devices will give us greater insight into the behavior of complex systems than previously possible. The reality, however, is that configuring and managing billions of devices is extremely difficult.

As an illustration in the healthcare domain, imagine that a general-practice physician tells a patient that he'd like the patient to take home a wireless blood-pressure monitor and use it every day so that the physician can remotely monitor the patient's health. The intention is that the blood-pressure measurements taken by the patient while at home will end up stored in the patient's Electronic Health Record (EHR) at the physician's clinic. The physician can then see the patient's blood pressure on a daily basis and get automated alarms if any abnormal readings are recorded. At least three problems arise in making scenarios such as at-home blood-pressure monitoring a reality.

A first problem is that blood-pressure monitors, like many IoT sensors, do not come with long-range communication connections; they have only short-range radios such as Wi-Fi, Bluetooth, or Zigbee. The blood-pressure monitor must somehow get connected with other devices in the home such as a Wi-Fi access point (AP) in order to transmit its medical data to the physician's EHR system. Making those connections is difficult for many people, especially considering that different types of devices from different manufacturers often have different methods of making a connection and that the devices themselves often have very limited user interfaces.

A second problem with this blood-pressure scenario is that once a connection is made between the blood-pressure monitor and a device capable of transmitting data long distances, the blood-pressure readings must get to the right patient record in the right physician's EHR system. This implies that the blood-pressure readings must be augmented with additional credentials (e.g., patient ID, password) and destination information (e.g., a Restful API URL).

A third problem arises when devices partner with other nearby devices so they can work together in a peer-to-peer fashion, such as a blood-glucose monitor working with an insulin pump. In these peer-to-peer cases the devices may maintain a connection with a long-range communication device, but may also need a connection with neighboring devices using encryption based on a unique key for a specific pair of devices, rather than a common key shared by all devices. Establishing the encryption can be difficult if the devices have never met before and have never shared a secret key.

SUMMARY

In one embodiment, an apparatus securely transfers first data to a target device. The apparatus includes a first antenna, a second antenna positioned a fixed distance from the first antenna, a transmitter, and a processor configured to control the transmitter to transmit a first signal containing second data selectively from one of the first antenna and the second antenna based upon the first data. The first data may only be received by the target device when the target device within close proximity of the first and second antennae, and the second data does not include the first data.

In another embodiment, a method securely transfers first data from a source device to a target device. A wireless signal having (a) a higher speed channel conveying second data and (b) a lower speed channel conveying the first data is transmitted. The lower speed channel is formed by selectively transmitting the wireless signal from one of a first and second antennae of the source device based upon the first data. The first and second antenna are positioned a fixed distance apart and the target device uses a received signal strength indication (RSSI) of the first signal to decode the lower speed channel and receive the first data.

In another embodiment, an apparatus securely transfers first and second data to a target device, where the first data includes encryption information. The apparatus includes a first antenna, a second antenna positioned a fixed distance from the first antenna, at least one transmitter, and a processor configured to selectively switch the transmitter between the first antenna and the second antenna based upon the first data, wherein the second data is encoded independently of the coupling of the at least one transmitter to the first and second antennae.

In another embodiment, a system securely transfers first data from a source device to a target device. The source device includes a first antenna, a second antenna positioned a fixed distance from the first antenna, a transmitter, and a processor configured to control the transmitter to transmit a first signal containing second data selectively from one of the first antenna and the second antenna based upon the first data. The target device includes an antenna configured for receiving the first signal from the source device, a receiver electrically coupled with the antenna and configured to determine a received signal strength indicator (RSSI) of the first signal, and a processor configured to receive the RSSI of the first signal from the receiver and to determine the first data therefrom. The first data may only be received by the target device when the target device within close proximity of the first and second antennae. The second data does not include the first data and the target device determines when it is positioned within a back lobe of the source device when polarity of received data is inverted.

DETAILED DESCRIPTION OF THE EMBODIMENTS

The disclosure herein presents a novel approach that accomplishes all three of the above goals.

Figure 1:
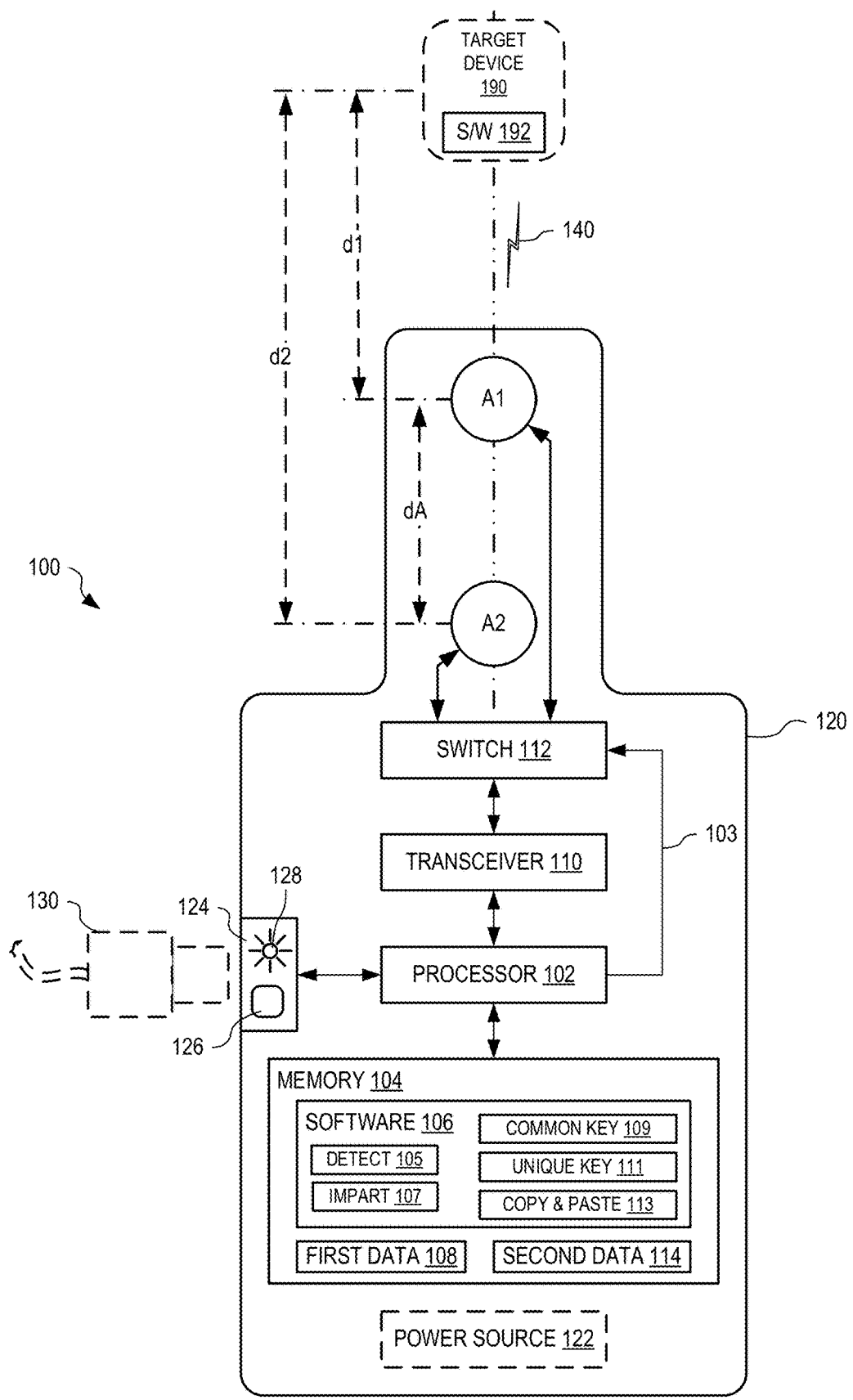
FIG. 1 shows one exemplary wand for securely configuring a target device, in an embodiment.
Figure 2:
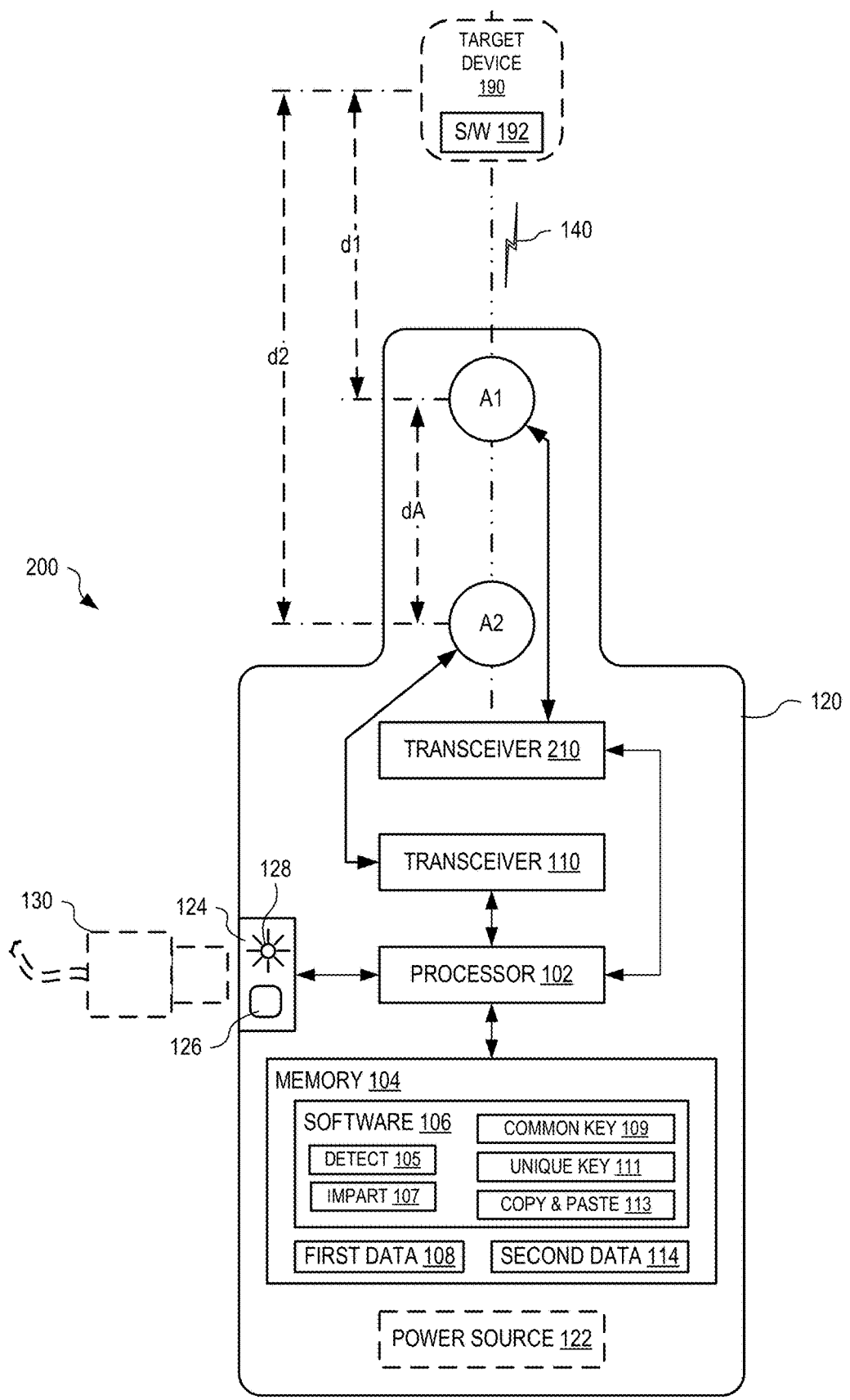
FIG. 2 shows another exemplary wand, similar to the wand of FIG. 1, but where the switch is omitted and a second transceiver is added, in an embodiment.

FIG. 1 shows one exemplary wand 100 for securely configuring a target device 190. Wand 100 is an apparatus that includes a processor 102, a memory 104, a transceiver 110, a switch 112, and two antennae A1 and A2. FIG. 2 shows another exemplary wand 200, similar to wand 100, but where switch 112 is omitted and a second transceiver 210 is added. FIGS. 1 and 2 are best viewed together with the following description. In one embodiment, processor 102 and memory 104 form part of a Raspberry Pi B+ computer. In the following description, references to wand 100 may also apply to wand 200. Wand 100 may be implemented in other forms without departing from the scope hereof. For example, wand 100 may be implemented with a mobile phone (e.g., smart phone) or other such similar device. That is, wand 100 is not limited in form to a long thin pointing type device as shown in FIGS. 1 and 2.

Wand 100 also includes a housing 120 that physically positions antenna A1 relative to antenna A2 with a distance dA therebetween. Antennae A1 and A2 and distance dA are selected based upon intended operating frequency of transceiver 110 and transceiver 210. In one embodiment, transceiver(s) 110, 210 operate at 2.4 GHz (Wi-Fi), antennae A1 and A2 are Wi-Fi antennae, and distance dA is approximately 7 cm (½ wavelength is approximately 6.25 cm). Where transceiver(s) 110, 210 operate at 5 GHZ, distance dA is approximately 3 cm. As distance dA increases beyond ½ wavelength, the effective range of wand 100/200 increases. Conversely, as dA decreases to be less than ½ wavelength, operational range of wand 100/200 decreases. In one embodiment, housing 120 is shaped to indicate orientation of wand 100 and thus orientation of antennae A1 and A2, such that a user may 'point' wand 100 at target device 190. Target device 190 includes a processor, memory, and a receiver, for example.

Wand 100 may also include an interface 124 with one or more buttons 126 (e.g., a push button, capacitive input device, or other such input devices), one or more indicators 128 (e.g., a light emitting diode (LED) or other similar indicating device), and/or one or more audio emitters (e.g., speaker). Interface 124 may also include electrical coupling (e.g., a socket) for coupling with an external device via a plug or other similar devices. For example, first data 108 may be loaded from an external device (e.g., one of a computer, a router, and other such devices) via interface 124. Alternatively, first data 108 may be received wirelessly by wand 100 via transceiver 110, 210 and one of antenna A1, A2.

Wand 100 may also include a power source 122 that powers electronic components of wand 100 to allow portable operation. In one embodiment, transceivers 110, 210 operate at Wi-Fi frequencies (e.g., 2.4 GHz, 5 GHz), antenna A1 and A2 are selected accordingly, and positioned with separation dA equal to seven centimeters (approximately half the wavelength of the transmitting frequency). Where dA is set to a distance of ½ wavelength, it is difficult for an adversary device that is not proximate wand 100/200 to determine which antenna (A1 or A2) was used to transmit. Although wand 100/200 works at other antenna spreads, a distance of ½ wavelength provides optimal operating range and security. Where antenna A1 is a distance d1 from the antenna of target device 190, antenna A2 will be a distance of d1+dA (e.g., 7 cm) when wand 100 is pointing directly at the antenna of target device 190.

Memory 104 stores software 106 that includes machine-readable instructions that are executed by processor 102. In wand 100, software 106 is configured to control switch 112, via control signal 103, to electrically couple one of antennae A1 and A2 with transceiver 110, where only one of antenna A1 and A2 is electrically coupled with transceiver 110 at any time. In wand 100, software 106 is also configured to control, based upon information of first data 108, transceiver 110 and switch 112 to cooperatively transmit a wireless signal 140 to target device 190. Within wand 100, operation of switch 112 forms a lower speed secure data channel within signal 140. Simulation may be performed to take into account PCB parasitic effects and antennae interaction to verify that the antennae do not interact and operate as a directional antenna. In wand 200, software 106 is configured to control, based upon information of first data 108, one of transceivers 110, 210 to transmit signal 140, via a corresponding one of antennae A1 and A2 within wireless signal 140 to target device 190. Thereby, within wand 200, control of transceivers 110, 210 forms the lower speed secure data channel of signal 140.

Information of first data 108 is not included within content (e.g., within conventional data packets of the higher speed channel) of signal 140. Rather, for each bit of information of first data 108, a portion of signal 140 (e.g., one packet) is transmitted from a selected one of antenna A1 and A2 based upon the value (0 or 1) of the bit. Thus, although wireless signal 140 conveys a second data (e.g., second data 114) conventionally within conventional data packets of the higher speed channel, reading and decoding this higher speed channel (e.g., the data portion of the data packets) does not result in gaining first data 108. However, when wand 100 is within sufficiently close proximity to target device 190, the receiver within target device 190 may decode the lower speed channel by detecting a received signal strength indication (RSSI) ratio between received portions (e.g., data packets) of signal 140 based upon which antenna (A1, A2) was used to transmit that portion of signal 140 from wand 100. The information of first data 108 within the lower speed channel is thereby received by target device 190 as an amplitude modulated (AM) signal; however, this lower speed channel may only be decoded when target device 190 is sufficiently close to wand 100/200. Second data 114 may be conveyed within the higher speed channel (e.g., within conventional data packets) independently of data conveyed by the slower speed channel. Signal 140 may use one of amplitude modulation (AM), frequency modulation (FM), and quadrature amplitude modulation (QAM), and so on. That is, signal 140 is a conventional signal that conveys second data conventionally within the higher speed channel. In one embodiment, this higher speed channel is based upon Wi-Fi protocols that include data packets.

The lower speed channel is used to convey first data (e.g., first data 108) that may include authentication and encryption keys only to target device 190 when sufficiently close to wand 100/200. That is, first data is only intended to be received by target device 190 and is therefore sent over the lower speed channel. The higher speed channel may convey second data, such as a MAC address, cyclic redundancy check, sequence number, optional payload, within conventional packets of the used protocol and this higher speed channel may be received by devices that are not proximate wand 100/200. In one example of use, the higher speed channel is used to convey second data that is encrypted using a secure key (e.g., known only to wand 100/200), where this secure key is conveyed as first data over the lower speed channel and is thereby only received by target device 190 when proximate to wand 100/200. The higher speed channel may be used to convey status, retransmission requests for specific bits of first data 108, and/or a request to retransmit the entire message. Thus, the higher speed channel may be used to verify first data 108 and to reconstruct missing bits of first data 108 as necessary without including first data 108.

Wand 100 may be used to connect wireless devices, where first data 108 represents a wireless protocol and key configuration that is imparted from wand 100 to each wireless device. Wand 100 may be used to impart any type of information securely onto a targeted, nearby device, without the requirement for specialized hardware (or any hardware changes) in the target device. Use of wand 100 does not use complex algorithms or complicated cryptography libraries, and does not require target device 190 to be adjacent, or even movable. Wand 100 may be used to wirelessly and securely configure large appliances as well as small mobile devices by using a wireless capability already found on the target device. Once the target device is configured, wand 100 is not needed for further communication.

Target device 190 is assumed (a) to have at least one radio antenna that it can use to transmit and receive wireless data, (b) to be able to measure the signal strength of wireless communication packets, and (c) to be able to run a small piece of software that implements a read protocol. Target device 190 need not have sensors such as cameras, microphones or accelerometers, and it need not be altered to add new hardware. That is, target device 190 need not have a specific user interface, such as typically included to allow configuration of the device.

Wand 100 is assumed (i) to be trusted to generate a secret key, (ii) to include wireless capability (e.g., transceivers 110, 210) compatible with that of target device 190 and two antennae located approximately one half wavelength apart, (iii) to be portable such that it may be brought close to and pointed at target device 190, and (iv) to run the communication protocol.

In one embodiment, only a transmitter section of transceiver 110 is switched between antenna A1 and antenna A2, and a receiver section of transceiver 110 remains coupled to a single antenna (e.g., one of antenna A1 or A2) at any given moment. In another embodiment, transceivers 110 and 210 are implemented as two transmitter sections, each electrically coupled to a different one of antennae A1 and A2, and a single receiver section electrically coupled to one of antennae A1 and A2.

Wand 100 provides a novel approach for imparting information onto target device 190, even where target device 190 is otherwise unknown and does not have any secret keys pre-installed. Wand 100 provides a consistent, fast, easy, and secure method for imparting any kind of information onto target device 190, regardless of device type or manufacturer of target device 190, and without hardware modifications to the target device. Wand 100 may implement an efficient and robust proximity-detection technique, a protocol for imparting a common key (e.g., a Wi-Fi service set identifier (SSID) and password) onto a new device, a protocol for introducing two devices so they may establish secure, user-intended, communication, and a protocol for imparting a cloud identity and credentials into a new device.

A radio signal transmitted by an antenna attenuates, or fades, as it travels through the air according to the well-known free-space propagation model given in Equation (1):

$$P_r = P_s G_s G_r \left(\frac{\lambda}{4\pi d}\right)^2 \quad (1)$$

where $P_r$ is the power received in watts, $P_s$ is the power at the surface of the sending antenna in watts, $G_s$ and $G_r$ are the gains of the sending and receiving antennae, respectively, $\lambda$ is the frequency of the signal, and d is the distance between the sending and receiving antennae.

This model assumes the radio waves travel through free space without bouncing off any surfaces before striking a receiving antenna. Equation (1) tells us that as the distance between the transmitter and receiver increases, the signal strength at the receiver decreases. Because wand 100 does not change antennae or frequencies, the received power is driven by the distance d between the transmitter and receiver.

It is sometimes useful to consider signal strength in relation to a known amount of power. In that case, dBm (which expresses power in decibels compared to one milliwatt (mW)) is often used. The conversion is given by Equation (2) where log refers to the base 10 logarithm:

$$dBm = 10\log\left(\frac{P_r}{1\ \text{mW}}\right) \quad (2)$$

Using Equation (2), Equation (1) may be rewritten in dBm for free space, as shown in Equation (3):

$$P_r = P_0 - 10\alpha\log\left(\frac{d}{d_0}\right) \quad (3)$$

where $P_r$ is now the received power in dBm, $P_0$ is the power in dBm received at a distance of $d_0$ from the transmitter, and $\alpha$, called the path-loss exponent, represents the reduction in power as the signal travels. In free space $\alpha$ is 2. $P_x$ is used to indicate power in dBm predicted by radio signal propagation models, and RSSI is used to indicate power measured in dBm by actual hardware.

Equation (3) is a good approximation of signal attenuation in free space, but in the real world obstacles, moving and fixed, may attenuate a signal or cause reflections that create multiple paths between a transmitter and a receiver. The result is that multiple copies of the transmitted signal, each with a different attenuation, delay, and phase shift, arrive at the receiver superimposed upon each other. This superposition can result in either constructive interference where multiple copies of the signal add to each other, or destructive interference where multiple copies of the signal cancel each other. The change in signal strength caused by obstacles is often called fading.

There are two types of fading: slow and fast. Slow fading occurs when changes to the signal strength happen slowly over time. Shadowing, where an obstacle such as a building lies between the transmitter and receiver, is an example of slow fading. In this case the alteration to the signal strength is normally constant unless the transmitter or receiver moves. Fast fading occurs when changes to the signal strength happen quickly such as when a moving obstacle comes between a transmitter and receiver.

Fading may be accounted for by altering Equation (3) to add a noise component, which gives us the log-normal shadow model:

$$P_r = P_0 - 10\alpha\log\left(\frac{d}{d_0}\right) + \chi_\sigma \quad (4)$$

where $\chi_\sigma$ is a Gaussian random variable representing noise with zero mean and standard deviation $\sigma$ (in the case of slow fading) or follows a Rayleigh or Rician distribution (in fast fading environments). As noted above, in free space $\alpha$ is 2, but it in real-world dynamic environments $\alpha$ normally ranges from 1.2 to about 8.

In a dynamic environment where there are multiple moving objects, $\chi_\sigma$ in Equation (4) may change rapidly, making actual measurements of RSSI highly variable.

In this kind of dynamic environment, the moving objects are changing their position relative to the transmitter—which slightly changes the length of the path from the transmitter to the receiver. The difference in path length, in turn, slightly alters the phase of the received signal. This change in phase may change how the multiple copies of the signal add up to create constructive or destructive interference. Finally, the Doppler effect of the moving obstacle slightly changes the frequency of the received signal, and interference has been shown to vary greatly depending on the frequency of the signal.

In addition to the environmental variables, the signal strength captured by real equipment is also subject to manufacturing variability as well as thermal noise in the antenna. Wand 100 exploits the variability from manufacturing and thermal noise, together with variability from obstacles in the environment, to make it difficult for an adversary to eavesdrop on communications between wand 100 and target device 190.

To understand the role environment plays in signal propagation, the signal strength of Wi-Fi packets exchanged between a computer and a Wi-Fi AP were captured in three very different (but realistic) locations where wand 100 might be used. The first location was a quiet home environment where no one was moving, the second location was a local coffee shop where a small number of customers were milling about, and the third location was a busy computer science lab bustling with student activity. A MacBook Pro laptop connected to an Alfa Networks AWUS036H external Wi-Fi antenna was used and the RSSI returned by the Alfa card in the form of RadioTap headers were captured using a Python program written with Scapy. In all cases the receiving antenna was stationary while packets were exchanged with the AP.

Figure 3:
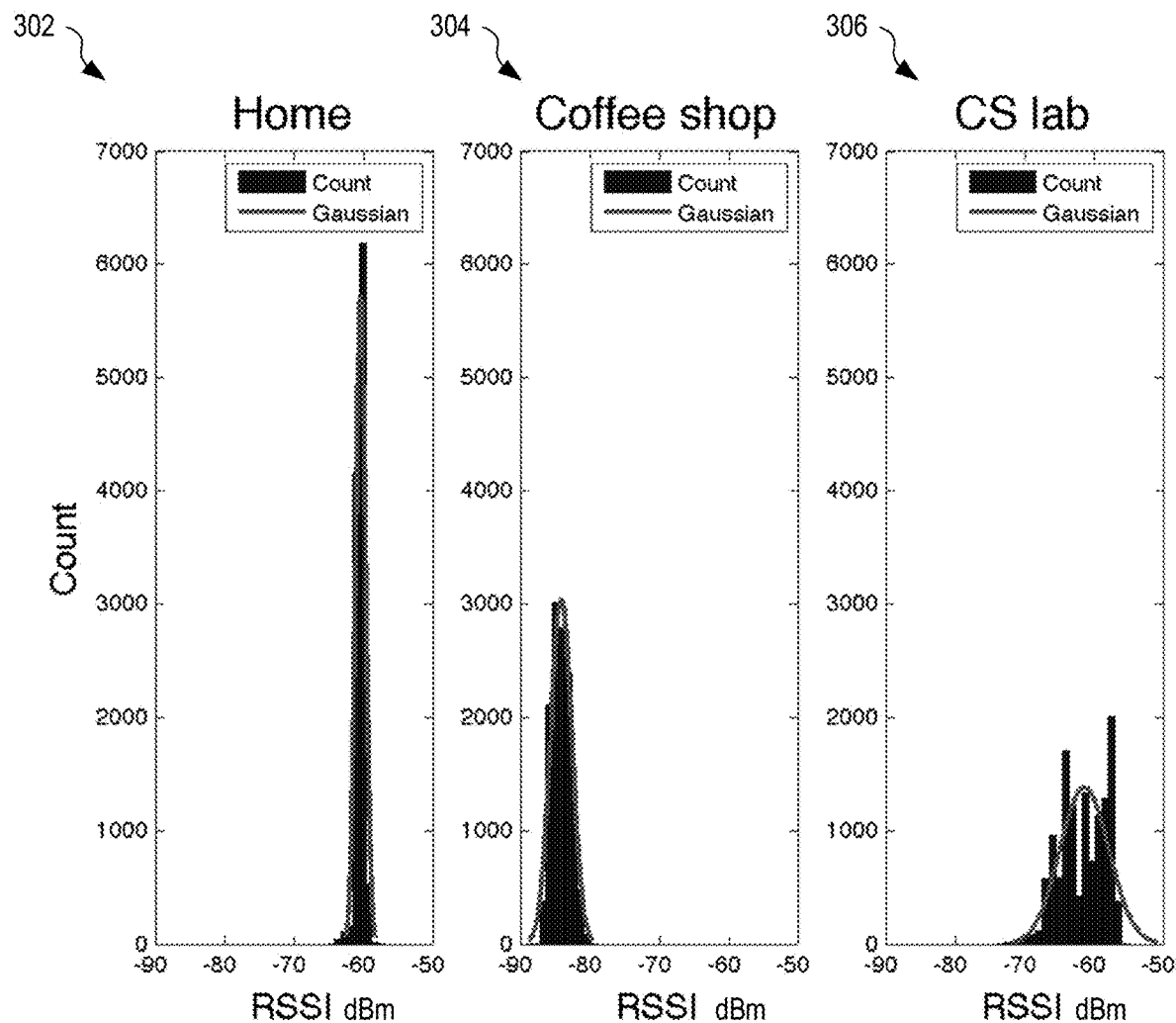
FIG. 3 shows three exemplary graphs illustrating distribution of received signal strength indication (RSSI) measurements returned by capturing 12,000 Wi-Fi packets sent between a Wi-Fi AP and the receiving antenna in each of a home, a coffee shop, and a Computer Science lab.

FIG. 3 shows three exemplary graphs 302, 304, 306 illustrating distribution of RSSI measurements returned by capturing 12,000 Wi-Fi packets sent between a Wi-Fi AP and the receiving antenna in a home, in a coffee shop, and in a computer science lab, respectively. Each graph 302, 304, 306 shows a histogram of RSSI values measured, and a best-fit Gaussian distribution for the RSSI values. In the home and computer science lab, the distance between the access point and the receiver was approximately 4 meters. In the coffee shop the distance was approximately 8 meters. The differences in distance led to differences in RSSI, but as expected, due to moving obstacles, there is a wide range in variability of the RSSI. When packets were captured in the quiet home environment the RSSI readings were tightly grouped and had little variation; increased variability was noted in the coffee shop, and a great deal of variability in the busy lab. Table 1 provides details on the mean, standard deviation, and range of the packet RSSIs captured.

TABLE 1

RSSI mean, standard deviation, and range of 12,000 Wi-Fi packets captured at three different locations. The standard deviation and range of RSSI measurements increased as the number of moving obstacles increased.

| Location | Mean | Std Dev | Range |
| --- | --- | --- | --- |
| Home | −60 | 0.69 | 8 |
| Coffee shop | −84 | 1.50 | 10 |
| CS lab | −61 | 3.48 | 19 |

Although the variability in RSSI is lower in environments where there is little activity, it is important to note that there is still variability—RSSI readings were not the same for all packets. In the quiet home environment, there was still a range of eight RSSI values observed. Other researchers have found that even in an underground concrete tunnel where outside signals and the effects of moving obstacles are not present, there is still a variation of at least two dBm away from the mean.

Two insights may be gleaned from the above concepts. A first insight is that if a device has two antennae, it can determine when it is in close proximity to another device that is transmitting a radio signal. A second insight is that when a device with two antennae determines it is in close proximity to another device, it may use its two antennae to securely impart information to the other device. As shown in FIG. 1, wand 100 has two antennae A1 and A2.

Wand 100 may implement detect primitive 105 to determine if it is in close proximity to another device transmitting a radio signal. Wand 100 independently measures the RSSI of the radio signal on each of the two antennae A1 and A2. Building on Equation (4), the RSSI values received on the two antennae of wand 100 will be:

$$P_1 = P_0 - 10\alpha\log\left(\frac{d_1}{d_0}\right) + \chi_\sigma \quad (5a)$$

$$P_2 = P_0 - 10\alpha\log\left(\frac{d_2}{d_0}\right) + \chi_\sigma \quad (5b)$$

where $P_0$ is the power in dBm measured at a distance of $d_0$ from the transmitter, $P_i$ is the power in dBm measured at receiving antenna $A_i$, and $d_i$ is the distance between the transmitter and receiving antenna i.

Armed with the equations in (5a) and (5b), the difference in signal strength between the two antennae A1 and A2 is calculated as follows:

$$P_1 - P_2 = P_0 - 10\alpha\log\left(\frac{d_1}{d_0}\right) + \chi_\sigma - \left(P_0 - 10\alpha\log\left(\frac{d_2}{d_0}\right) + \chi_\sigma\right) \quad (6a)$$

$$= -10\alpha\left(\log\left(\frac{d_1}{d_0}\right) - \log\left(\frac{d_2}{d_0}\right)\right) \quad (6b)$$

$$= -10\alpha\log\left(\frac{d_1}{d_2}\right) \quad (6c)$$

Antennae A1 and A2 are physically close together (e.g., 7 cm apart in one embodiment—approximately ½ wavelength). Because they are close together, the environmental factors represented by $\chi_\sigma$ are likely to be similar on each antenna. By taking the difference in signal strength observed on two antennae, sometimes called the RSSI Ratio, the environmental factors cancel out. This suggests that some of the randomness of the environment, shown in FIG. 3, may be minimized in the RSSI Ratio on wand 100.

When the distance between antennae A1 and A2 is small relative to distances d1 and d2 between these antennae and the transmitter, then the RSSI determined for each antenna A1, A2, may be approximately equal. This happens when the receiving device is far away from the transmitting device. For example, where antennae A1 and A2 are 7 cm apart and are aligned with the transmitting antenna such that $A_2$ is 7 cm farther away from the transmitting antenna than A1 (see FIGS. 1 and 2), then $d_2 = d_1 + 7$ cm. Further, where the distance $d_1$ between A1 and the transmitting antenna is 30 cm (i.e., more than 4 times the distance dA between antennae A1 and A2), then using Equation (6c) and assuming $\alpha=2$ yields a difference, $\Delta$, of:

$d_1 = 30$ cm $d_2 = 30$ cm+7 cm=37 cm $\Delta = -10\alpha \log(30/37)$, approx 1.8 dBm (7)

When the distance to the transmitter is small relative to the distance between antennae $A_1$ and $A_2$, then the difference between received power on the two antennae will be large. That is, when wand 100 is close to target device 190, the distance, $d_1$, between antenna A1 and the antenna on target device 190 is much smaller than distance dA between antennae A1 and A2, and the difference between received power on antennae A1 and A2 is large. For example, where target device 190 is located 1 cm from A1, then $d_1=1$ cm and $d_2=8$ cm, giving an expected difference in RSSI of $\Delta=-10\alpha \log(1/8)$, which is approximately 18.1 dBm.

Figure 4:
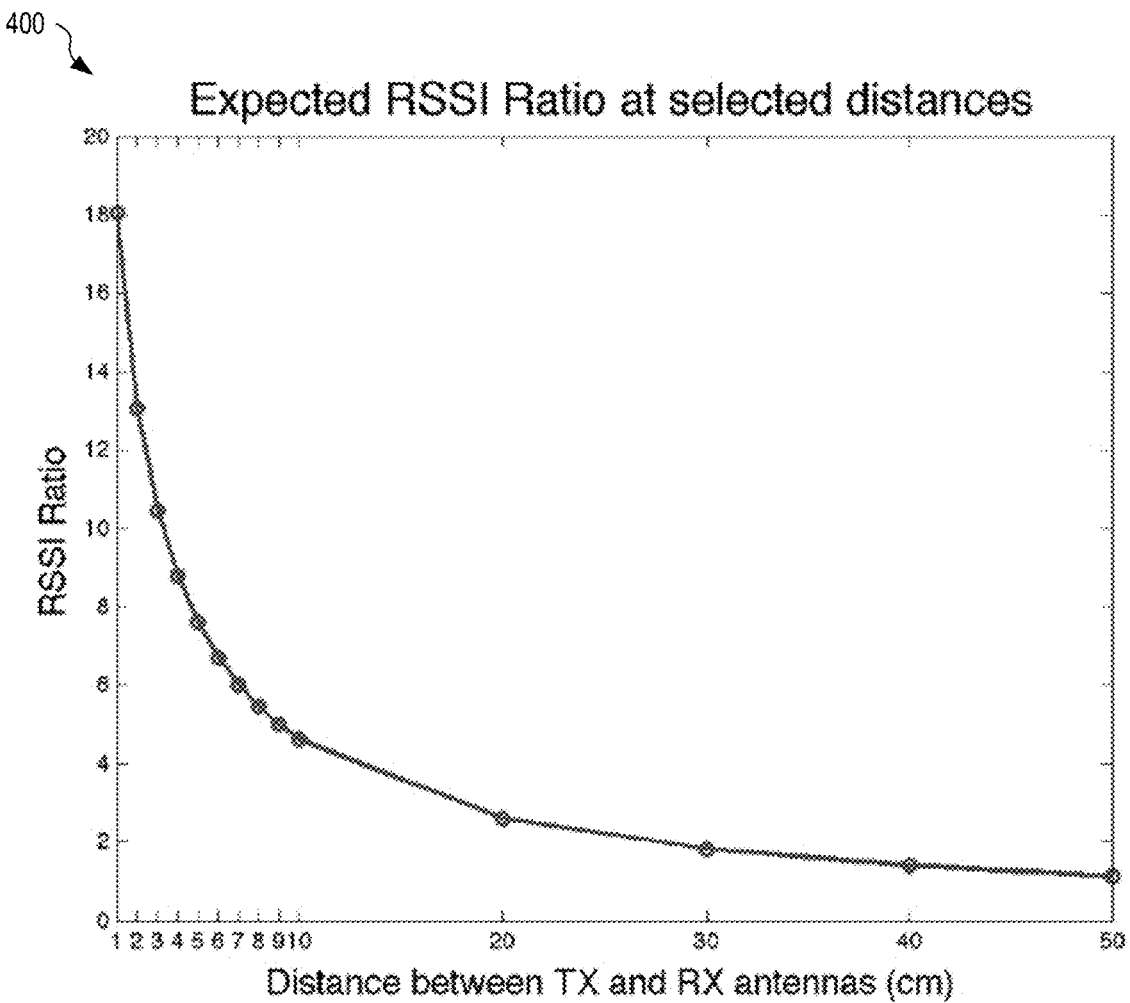
FIG. 4 shows one exemplary graph illustrating expected RSSI ratio plotted against distance between the transmitter and the nearest antenna A1.

Thus, when wand 100 is in close proximity to target device 190, the difference in RSSI readings between antennae A1 and A2 will be significantly larger than the difference between the power readings when the device is far away. In this example there is an expected 10-fold increase in the RSSI Ratio when wand 100 moves from 30 cm to 1 cm between target device 190 and A1. FIG. 4 shows one exemplary graph 400 illustrating expected RSSI ratio, according to Equation 6C, plotted against distance between the transmitter and the nearest antenna A1. As shown, as wand 100 moves close to the transmitter, the RSSI ratio increases dramatically, thereby allowing wand 100 to determine when it is in close proximity to target device 190.

Software 106, when executed by processor 102, is configured to determine when wand 100 and target device 190 are in close proximity by periodically calculating an average RSSI Ratio according to the following equations:

$$\bar{\delta} = \frac{1}{\omega}\sum_{i=1}^{\omega} r_1(i) - r_2(i) \quad (8a)$$

$$\text{close} = \begin{cases} \text{True} & \text{if } \bar{\delta} \geq \tau \\ \text{False} & \text{if } \bar{\delta} < \tau \end{cases} \quad (8b)$$

where i is the $i^{th}$ packet transmitted and $r_1(i)$ is the RSSI for packet i measured on antenna A1, $r_2(i)$ is the RSSI for the same packet measured on antenna A2, $\tau$ is a fixed-value (e.g., 6) threshold to determine if the devices are close, and $\omega$ is a window size of the number of RSSI packets received. $\tau$ may be adjusted; as $\tau$ is made larger, wand 100 and target device 190 need to be closer together before wand 100 indicates sufficiently close proximity, and as $\tau$ is made smaller wand 100 and target device 190 may be further apart, but this may introduce errors when transferring data from wand 100 to target device 190. In one embodiment, $\tau$ is set to 6 to ensure wand 100 indicates sufficiently close proximity when wand 100 and target device 190 are about 6 cm apart.

If the average difference $\bar{\delta}$ rises above $\tau$, then wand 100 determines that it is in close proximity to target device 190. Wand 100 may wait to check for proximity until it has received at least $\omega$ packets, and re-checks for proximity every $\omega/2$ packets afterward using the last $\omega$ RSSI values until it detects it is close to the device or times out. Using detect primitive 105, wand 100 may determine when it is in close proximity to target device 190, even if the target device has only a single antenna. If target device 190 has multiple antennae, wand 100 assumes that the target device transmits packets using only one of its antennae and does not change its transmitting antenna while wand 100 is executing detect primitive 105.

Figure 5:
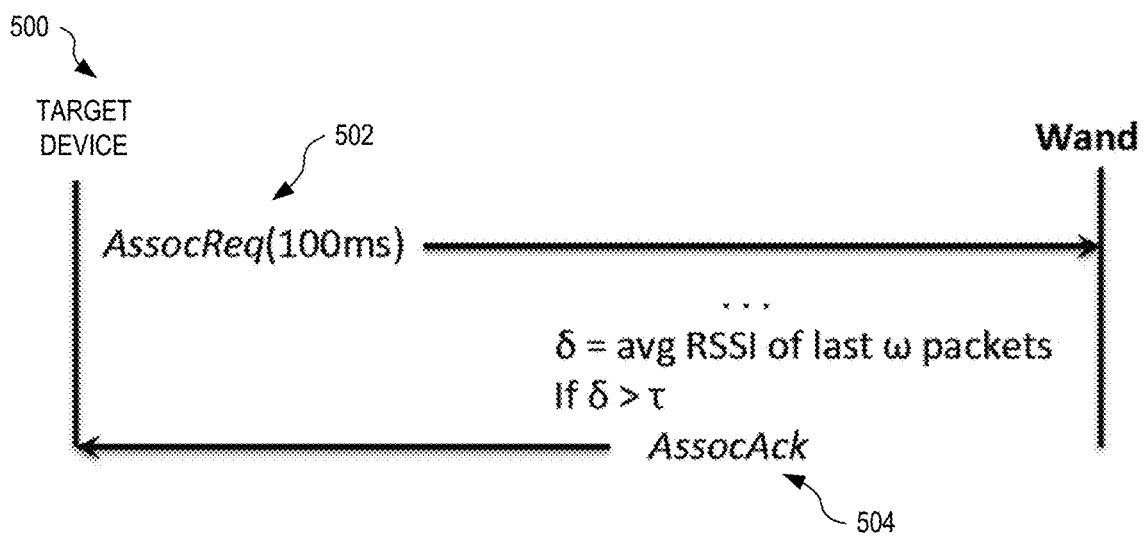
FIG. 5 illustrates exemplary communication between the wand and the target device of FIG. 1 during operation of the detect primitive, in an embodiment.

FIG. 5 illustrates exemplary communication between wand 100 and target device 190 during operation of detect primitive 105. Upon initiation (e.g., button press on target device 190) by a user, software 192 with target device 190 may cause target device 190 to broadcast an AssocReq packet 502 (e.g., Wi-Fi or similar) every 100 ms indicating that it is looking to connect with another device. Wand 100 receives these AssocReq packets 502 and determines whether wand 100 is in close proximity to target device 190 based upon Equations (8a, 8b). In one embodiment, wand 100 provides its user some visual or audio feedback to encourage the user to move wand 100 closer if needed. To provide that feedback, wand 100 uses the difference between the RSSI values of AssocReq packets received on antenna A1 vs. antenna A2. If the spread between RSSI readings is increasing, wand 100 is getting closer to target device 190. If the spread is reducing, wand 100 is getting farther away from target device 190. Wand 100 may indicate (e.g., using one or more indicators 128, or other means such as by generating an audio tone) whether wand 100 is getting closer or farther from target device 190. Where the location of the antenna in target device 190 is not obvious, a visual indicator such as a sticker bearing a recognizable logo could be affixed to target device 190 proximate the antenna to make detect easier. The user could then simply move wand 100 close to the sticker and initiate the detect process.

Once wand 100 determines that it is in sufficiently close proximity to target device 190, it transmits an AssocAck packet 504 to target device 190. Upon receiving the AssocAck packet 504, target device 190 stops transmitting AssocReq packets.

Once wand 100 has determined, using detect primitive 105, that it is close proximity to target device 190, it may invoke an impart primitive 107 that exploits a property of radio wave propagation called reciprocity to impart information onto target device 190. Reciprocity says that a signal will experience the same multipath properties (e.g., attenuation phase shifts, delays) in both directions of the link. This means that fading characteristics that occurred for transmissions from target device 190 to wand 100 will be substantially the same for a signal transmitted from wand 100 to target device 190. That is, due to reciprocity, target device 190 should see a large difference in RSSI when wand 100 transmits from antenna A1 vs. when wand 100 transmits from antenna A2.

Software 192 within target device 190 exploits this expected difference in RSSI to receive the imparted information. Wand 100 first converts information of first data 108 into a binary string m and then sends m one bit at a time. To send a 1, wand 100 may send a packet using the closest antenna, A1. To send a 0, wand 100 may send a packet using the farthest antenna, A2. Antenna A1 and A2 may be swapped without departing from the scope hereof. Close proximity of wand 100 to target device 190 results in software 192 determining a large difference in RSSI depending on which antenna A1, A2 of wand 100 was used for transmission of the data packet. Continuing with the above example, where antennae A1 and A2 are 7 cm apart, wand 100 is pointing directly at target device 190 so that d2=d1+7 cm, and distance d1 is 3 cm, then with $\alpha=2$ the signal-strength difference as received on the device would be about 10.5 dBm based upon Equation (6). Thus, RSSI of packets sent from antenna A1 will be significantly higher than RSSI of packets sent from antenna A2.

Figure 6:
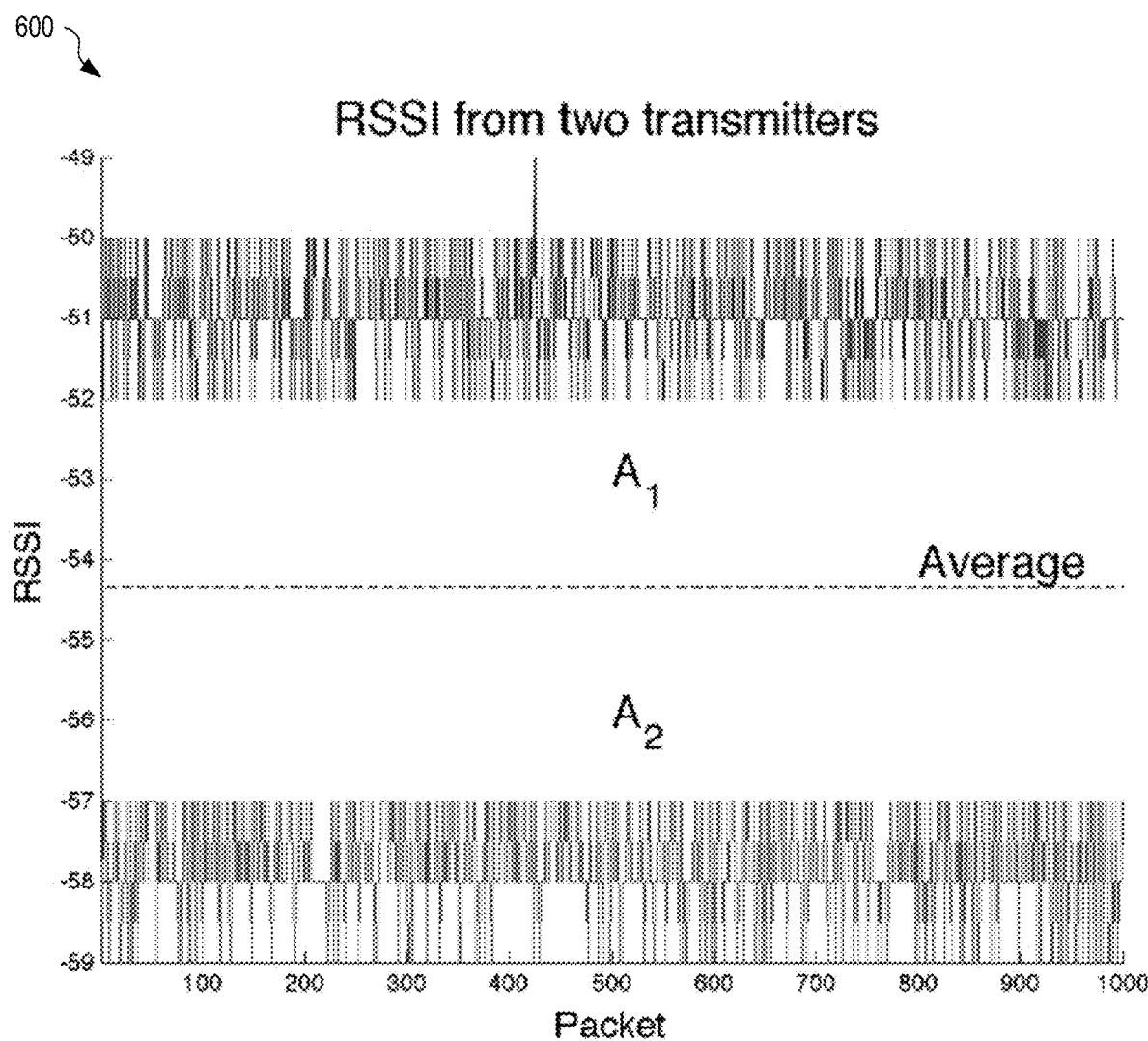
FIG. 6 shows exemplary RSSI at a receiving antenna for 1,000 Wi-Fi packets transmitted from the antennae A1 and A2 of FIG. 1, in an embodiment.

FIG. 6 shows exemplary RSSI for 1,000 Wi-Fi packets transmitted from antenna A1, located 3 cm from the receiving antenna of target device 190, intermixed with 1,000 Wi-Fi packets sent from antenna A2, located 10 cm from the receiving antenna of target device 190. As shown in FIG. 6, there is a large difference in RSSI depending on the antenna transmitting the packet. In this case, the RSSI values are consistent with Equation (6) with the path loss exponent $\alpha=1.6$.

To decode the message m sent by wand 100, software 192 within target device 190 calculates the average RSSI over all packets received and then compares the RSSI value for each individual packet with the average RSSI. If the RSSI for the individual packet is above the average, software 192 determines that the received packet represents a 1. If the RSSI of the individual packet is below the average, software 192 determines that the received packet represents a 0. More formally:

$$\bar{r} = \frac{1}{\omega}\sum_{i=0}^{n} r(i) \quad (9a)$$

$$\tilde{m}(i) = \begin{cases} 1 & \text{if } r(i) \geq \bar{r} \\ 0 & \text{if } r(i) < \bar{r} \end{cases} \quad (9b)$$

where r(i) is the RSSI measured on the single antenna of the target device for packet i and $\tilde{m}(i)$ is the $i^{th}$ bit in the message received. Once this process is complete the device will have a string $\tilde{m}$ representing the string m sent by wand 100.

Figure 7:
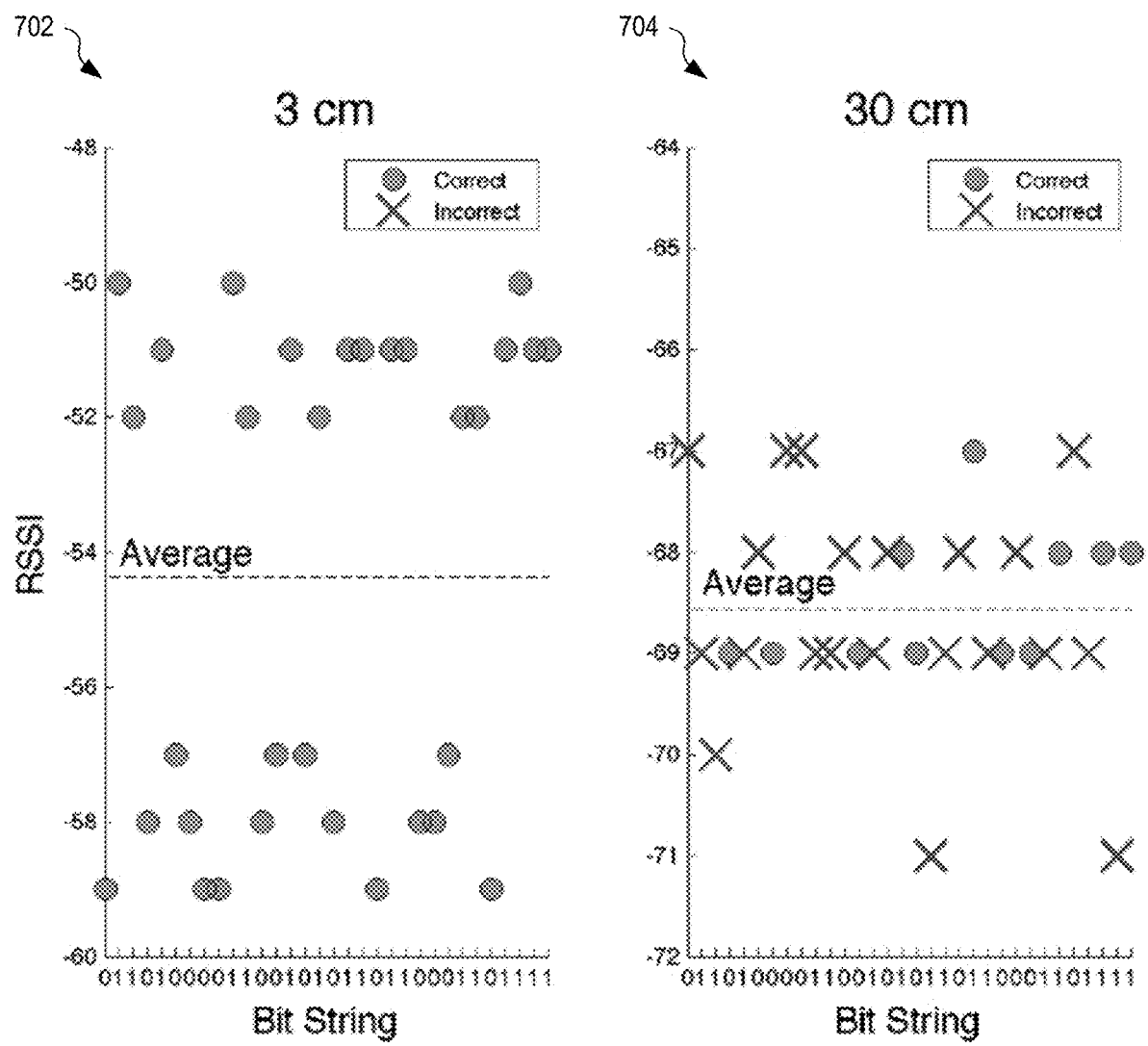
FIG. 7 shows a first and second graphs illustrating exemplary reception of message m at distances of 3 cm and 30 cm, respectively.

To illustrate operation of impart primitive 107, the message "hello" is converted into binary and sent to target device 190 using impart primitive 107. FIG. 7 shows a first exemplary graph 702 illustrating reception of message m where target device 190 is at a distance of 3 cm from antenna A1 of wand 100, and a second graph 704 illustrating reception of message m where target device 190 is at a distance of 30 cm from antenna A1 of wand 100. In FIG. 7, packets representing bit values of 1 should be received on the target device with an RSSI above the average and packets representing bit values of 0 should be received below the average. Circles represent bits received correctly and X's represent errors. In the example of FIG. 7, message m was received without error at 3 cm, but had numerous errors at 30 cm.

To ensure target device 190 is not missing any bits in message m due to dropped packets, each packet sent by wand 100 may include an increasing sequence number in the payload. Target device 190 uses this sequence number of each received packet to determine whether any packets have been missed. After it has received the last packet from wand 100, if any packets are missing target device 190 requests a resend of only those missing packets; otherwise it sends an empty list to wand 100.

To be clear, the information is transferred using the RSSI alone—the packets themselves sent do not contain portions of the message m. The payload of transmitted packets contains only the sequence number to allow target device 190 to identify any missing bits.

To execute impart primitive 107, wand 100 sends Message packets to target device 190, where each packet represents one bit in message m, transmitted from one of antenna A1 and A2 based upon the value of the bit. Wand 100 sends the entire message without waiting for any acknowledgement from target device 190. When all message bits have been transmitted, wand 100 sends a Done packet. The Done packet is like a Message packet, but it also includes a hash of m in the payload. Target device 190 records the RSSI for all of the Message packets and searches for missed packets upon receiving the Done packet from wand 100. If target device 190 detects any missed packets, it transmits a list of missing sequence numbers to wand 100 in the payload of a DoneAck message. If no packets are missing, target device 190 transmits the DoneAck with an empty payload. If the payload of the DoneAck is not empty, wand 100 resends only those missing packets followed by another Done packet. If the Wand does not receive a DoneAck packet, the Wand resends the Done packet. In an embodiment, each packet (i.e., each bit of message m) is acknowledged rather than waiting until all message bits have been transmitted.

Once target device 190 has received and stored RSSI values for each bit of message m, it computes the average RSSI of the packets received. Target device 190 then compares each of the stored RSSI values with the average RSSI to determine whether the corresponding bit of message m was a 1 or 0 as described above. This creates a message $\hat{m}$ on the device.

Finally, target device 190 hashes $\hat{m}$ and compares it with the hash of m included in the Done packet received from wand 100. If the computed hash matched the received hash, target device 190 knows that all packets have been received correctly. Where the hashes do not match, target device 190 tries flipping each bit in $\hat{m}$, one bit at a time; each time it re-hashes $\hat{m}$ and compares the re-hash with the received hash. If, after flipping all bits of $\hat{m}$, a match has not been found, target device 190 follows a similar pattern and tries flipping two bits each time. If target device 190 still does not compute a re-hash that matches the received hash, target device 190 signals wand 100 to restart by sending a Restart packet to wand 100. If target device 190 does find a match, target device 190 transmits a Success packet to wand 100.

Figure 8:
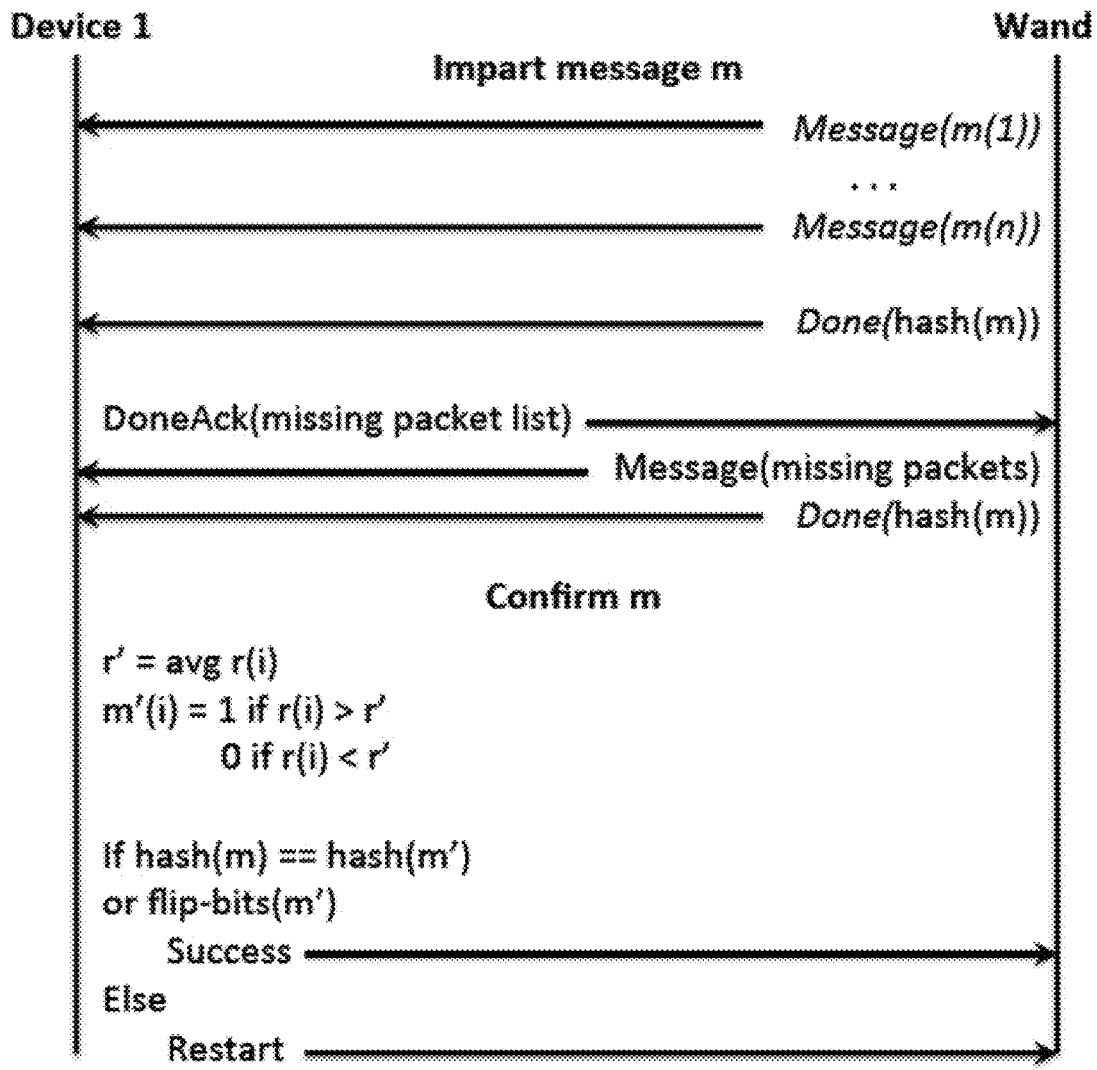
FIG. 8 is a flow sequence showing exemplary operation of the impart primitive of FIG. 1, in an embodiment.

FIG. 8 is a flow sequence 800 showing exemplary operation of impart primitive 107, illustrating Message packets m(1) . . . m(n) being sent from wand 100 to target device 190, followed by a Done packet containing a hash of m. Target device 190 then sends a DoneAck packet with a list of missing packet numbers to wand 100, and wand 100 retransmits any missing packets. Target device 190 derives a message $\hat{m}$ from the RSSI values of each received packets from wand 100, and confirms that message $\hat{m}$ matches message m by comparing the hashes of $\hat{m}$ and m. If the hashes do not match, target device 190 tries flipping bits in $\hat{m}$ to get a match.

In one embodiment, where the length of message m is long, wand 100 may divide message m into smaller messages to enable target device 190 to efficiently flip bits. On the other hand, short messages may be susceptible to an adversary discovering the message by brute-force flipping bits and hashing. Therefore, wand 100 may divide long messages and pad short message into 128-bit messages, for example.

As described above, wand 100 (and software 192 within target device 190) uses the primitive operations configured within detect primitive 105 and impart primitive 107 described above to build higher level protocols for configuring target device 190 (e.g., where target device 190 is to be configured for communication on a local-area network). The detect primitive 105 and the impart primitive 107 are used to implement three exemplary protocol operations: (1) common key, where a target device is imparted with parameters and a key that are common to all devices in a local-area network, (2) unique key, where two partnering devices connect using parameters and a key that is unique to the partnering devices, and (3) copy and paste, where wand 100 copies data from a first device and pastes it into another device without creating a lasting bond between devices.

Figure 9:
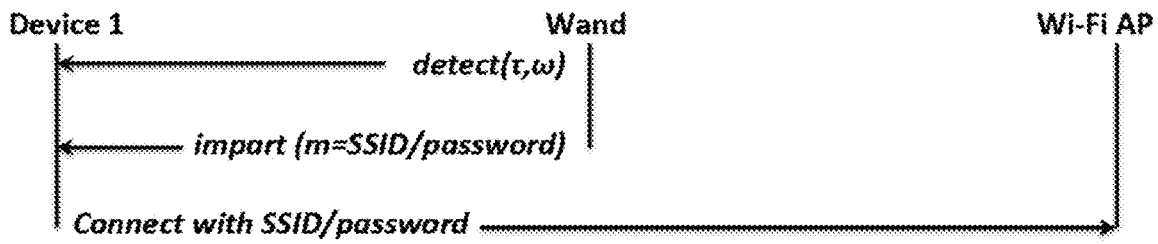
FIG. 9 is a flow sequence illustrating exemplary operation of a common key protocol of FIG. 1, in an embodiment.

As shown in FIG. 1 (and FIG. 2), software 106 includes a common key protocol 109 that is used for configuring target device 190 with common information, such as when target device 190 is new and is to be configured with parameters that are common to all devices in a local-area network. FIG. 9 is a flow sequence 900 illustrating exemplary operation of the common key protocol 109. FIGS. 1, 2 and 9 are best viewed together with the following description. In one example, where a patient receives a blood-pressure monitor and wishes to connect the blood-pressure monitor to a Wi-Fi network, the blood-pressure monitor needs to be configured with an SSID and a password (e.g., a key) of the Wi-Fi network access point (AP).

First data 108 may include the SSID and password of the AP, previously loaded into wand 100 using a wired universal serial bus (USB) connection (for example). In one embodiment, wand 100 is configured as a stick-shaped device that couples with a USB port of the AP, keeping its batteries charged until needed, and using the USB interface to securely receive connectivity parameters from the AP.

Common key protocol 109 and software 192 within target device 190 (e.g., the blood-pressure monitor) cooperate to first implement detect primitive 105 to ensure that wand 100 and target device 190 are within sufficient proximity of one another, and then use impart primitive 107 to transfer first data 108 (e.g., the SSID and password) from wand 100 to target device 190. Once target device 190 has confirmed it has properly received the SSID and password message, flipping bits if necessary as described above, target device 190 may connect to the Wi-Fi AP using the SSID and password parameters.

Thus, wand 100 gives only the target device 190 (i.e., the blood-pressure monitor) the information needed to connect with the Wi-Fi AP, after which the wand 100 is not required for future communications between the Wi-Fi AP and target device 190. First data 108 may represent other information, whether secret or not, that is to be transferred to target device 190, and is not limited to this Wi-Fi connection parameter example.

Figure 10:
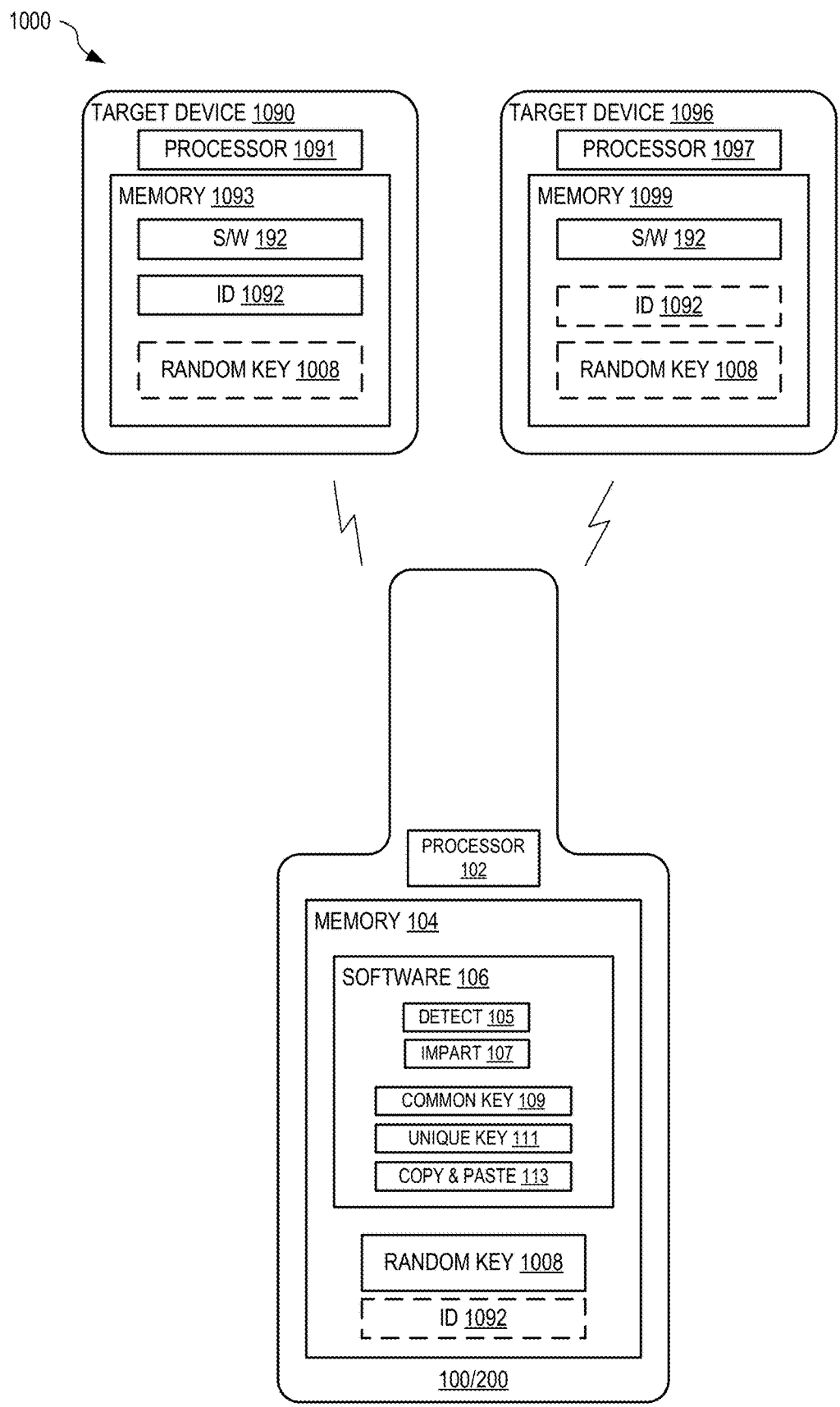
FIG. 10 shows the wand of FIG. 1 implementing a unique key protocol for establishing a wireless connection between two devices, in an embodiment.
Figure 11:
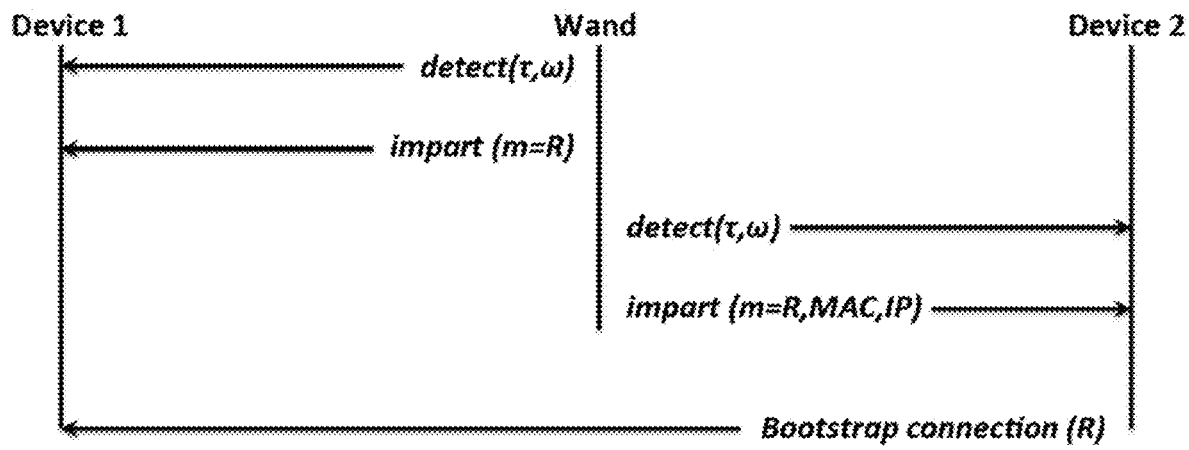
FIG. 11 is a flow sequence illustrating exemplary operation of the unique key protocol of FIG. 10, in an embodiment.

FIG. 10 shows wand 100 implementing a unique key protocol 111 for establishing a wireless connection between two devices 1090 and 1096, where the wireless connection is secured by a key meant to be known only to devices 1090 and 1096. Device 1090 includes a processor 1091 and a memory 1093 that cooperate to provide functionality of device 1090. Device 1096 includes a processor 1097 and a memory 1099 that cooperate to provide functionality of device 1096. Devices 1090 and 1096 each also includes at least a receiver to receive signals from wand 100/200. FIG. 11 is a flow sequence 1100 illustrating exemplary operation of unique key protocol 111. FIGS. 10 and 11 are best viewed together with the following description.

Within wand 100, unique key protocol 111 first generates a random key 1008. Wand 100 and target device 1090 run detect primitive 105 such that wand 100 determines when they are within sufficient proximity of one another for communication. Wand 100 then sends random key 1008 to device 1090 using impart primitive 107. Target device 1090 includes its unique identifier 1092 (e.g., one or more of internet protocol (IP) address, media access control (MAC) address, and other such identification) in the payload of the success message at the end of impart primitive 107 and unique key protocol 111 stores ID 1092 within memory 104.

Unique key protocol 111 then uses detect primitive 105 with the second device, target device 1096. Once proximity is established between wand 100 and target device 1096, unique key protocol 111 uses impart primitive 107 to send random key 1008 and ID 1092 to target device 1096. Once device 1096 has confirmed it has successfully received random key 1008 and ID 1092, wand 100 is no longer required. Device 1096 may then open direct communication with device 1090 by sending a hash of random key 1008 to device 1090 using ID 1092 obtained from wand 100. Device 1090 receives the hash from device 1096, notes the address of device 1096, and hashes its own copy of random key 1008. If the hashes match, then device 1090 may bootstrap a MAC or IP layer connection with device 1096 using random key 1008 as an initial key. If the hashes do not match, device 1090 may not attempt the connection.

Figure 13:
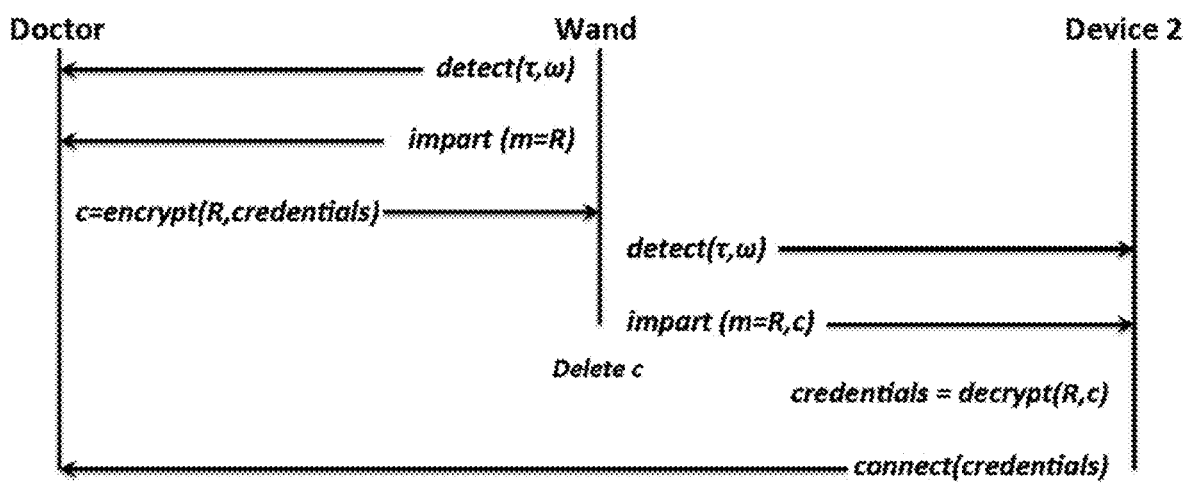
FIG. 13 is a flow sequence illustrating exemplary operation of the copy-and-paste protocol of FIG. 12, in an embodiment.
Figure 12:
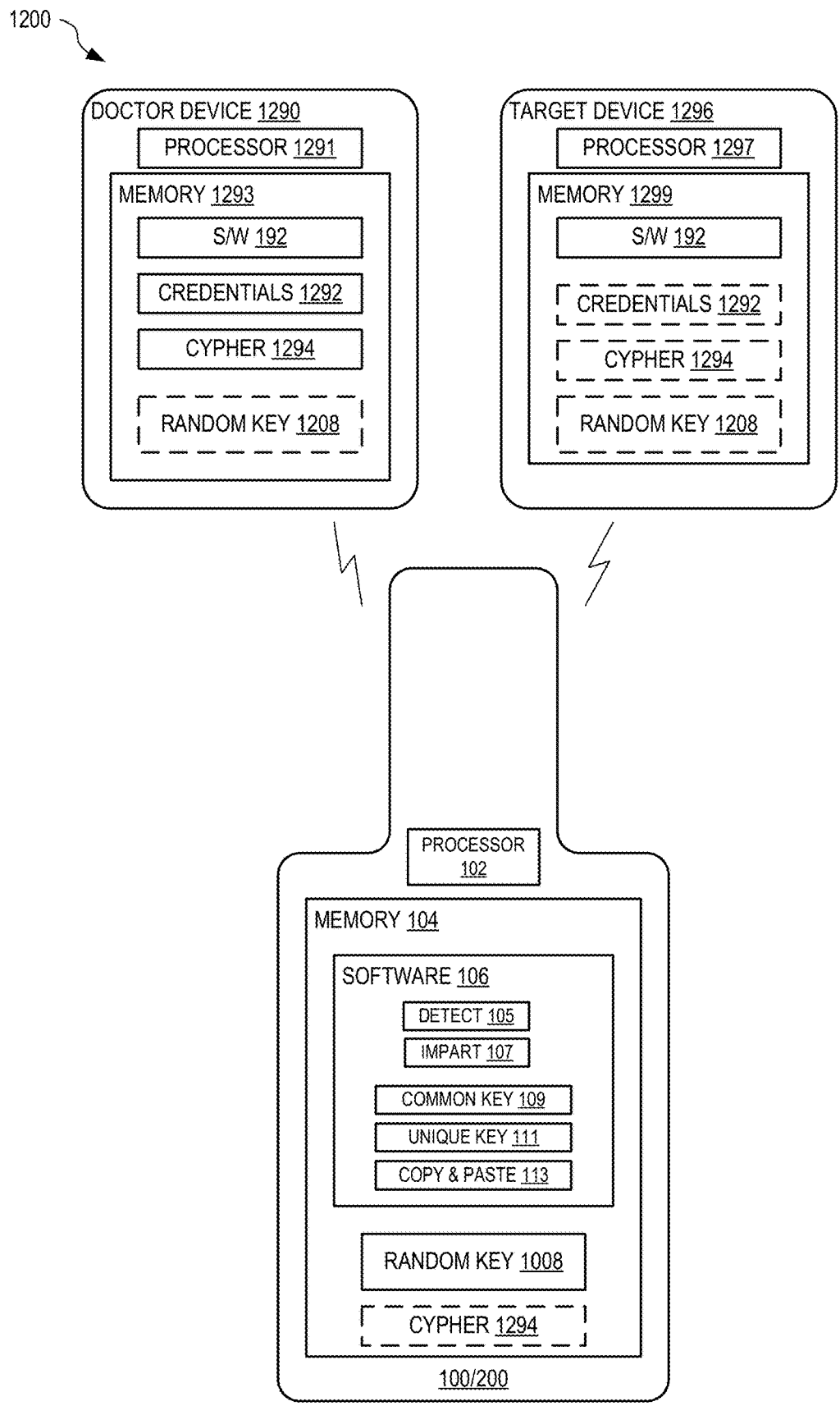
FIG. 12 shows the wand of FIG. 1 implementing a copy-and-paste protocol for copying data from a first device and pasting the data to a second device, in an embodiment.

One example where copying and pasting information would be useful is for the blood-pressure monitor scenario described above. FIG. 12 shows wand 100 implementing a copy-and-paste protocol 113 for copying data from a doctor device 1290 and pasting the data to a target device 1296. Device 1290 includes a processor 1291 and a memory 1293 that cooperate to provide functionality of device 1290. Device 1296 includes a processor 1297 and a memory 1299 that cooperate to provide functionality of device 1296. Devices 1290 and 1296 each also includes at least a receiver to receive signals from wand 100/200. FIG. 13 shows exemplary operation of copy-and-paste protocol 113. FIGS. 12 and 13 are best viewed together with the following example.

Doctor device 1290 and target device 1296 have no need to form a relationship, such as for communication as used in the example for common key protocol 109 and unique key protocol 111 described above. Continuing with the above example, the patient uses the blood-pressure monitor at home to take his/her blood pressure every day with the intention that the blood-pressure readings are to be stored on the physician's Electronic Health Record (EHR) system. As described above, wand 100 may use common key protocol 109 to configure the blood-pressure monitor for communication with his/her Wi-Fi AP, and while that adds long-range communication capability to the short-range blood-pressure monitor, it does not solve the problem of transferring the blood-pressure reading from the blood-pressure monitor into the EHR. To allow the blood-pressure readings to be stored within the EHR, the blood-pressure monitor (or optionally the Wi-Fi AP) is configured with the specific communication details that define how and where to send the blood-pressure readings. These specific communication details may include a Restful API URL and the patient's credentials such as ID and password for example. With these specific communication details, the medical readings from the blood-pressure monitor may be delivered to and stored within corresponding patient records in the EHR.

Continuing with the medical example, the patient brings wand 100 to the doctor's office and invokes the copy part of copy-and-paste protocol 113, which first generates a random key 1208 and then uses detect primitive 105 and impart primitive 107 to securely transfer random key 1208 to a computer (i.e., doctor device 1290) in the doctor's office that contains the patient's credentials 1292. Doctor device 1290 encrypts the patient's credentials 1292 using random key 1208 to generate a cypher 1294 and sends cypher 1294 to wand 100. Wand 100 stores cypher 1294 and the patient returns home with wand 100. The patient then performs the paste portion of copy-and-paste protocol 113, using detect primitive 105 and impart primitive 107, to send random key 1008 and cypher 1294 to target device 1296 (i.e. the blood-pressure monitor). Target device 1296 then decrypts cypher 1294 and uses credentials 1292 to send blood-pressure readings to the EHR and wand 100 deletes cypher 1294 (and optionally deletes random key 1008). In this way, copy-and-paste protocol 113 is used to securely copy data from one device (e.g., doctor device 1290) and to securely paste that data onto another device (e.g., target device 1296), even though devices 1290, 1296 are physically far apart.

The use of wand 100 alleviates (a) the complexity of manually configuring a device with sensitive communication parameters and other sensitive data, (b) the need to store unencrypted information on a third-party device. When performing the copy part of the copy and paste protocol, wand 100 may protect itself from storing malicious data by ensuring any received packets have a large RSSI ratio. This ensures the data is received from a nearby target device, and not from a distant attacker attempting to exploit wand 100.

Wand 100/200 may determine, based on the RSSI of the received signal on each of its antennas, when the transmitting device is in front or behind. For example, where the determined RSSI ratio between the two antennae is negative, then the target device is behind wand 100/200. Where the ratio is positive (as is normally assumed), the target device is in front of wand 100/200. In embodiments, target devices 190, 1090, 1096, 1290, and 1296, are configured to differentiate between front-lobe operation and back-lobe operation of wand 100/200 to prevent inadvertent configuration of the target device when proximate but behind wand 100/200. For example, where wand 100/200 is used to configure a first target device positioned in front of wand 100/200, such as on a patient, and a second target device is located on the user of wand 100/200, such as a care-giver, polarity of received bits of first data 108 within the lower speed secure channel indicates whether the target device is in front of or behind wand 100/200, since the positions of antennae A1 and A2 relative to the target devices are reversed. Such differentiation within target device 190 may prevent incorrect transfer and configuration of devices within the back-lobe of wand 100/200.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. In particular, the following embodiments are specifically contemplated, as well as any combinations of such embodiments that are compatible with one another:

A. Apparatus for securely transferring first data to a target device, including a first antenna, a second antenna positioned a fixed distance from the first antenna such that a received signal strength indicator (RSSI) for the first antenna measured at the target device will be different that the RSSI for the second antenna, a transmitter, and a processor configured to control the transmitter to transmit a first signal containing second data, the processor causing the transmitter to switch between transmitting the first signal with the first antenna and transmitting the first signal with the second antenna based upon bits of the first data. The second data does not include the first data.

B. The apparatus of embodiment A, the fixed distance between the first and second antenna being approximately a half of a wavelength of the first signal.

C. The apparatus of embodiments A and B, a distance between the first antenna and the target device is less than a distance between the second antenna and the target device.

D. The apparatus of either of embodiments A through C, the first signal is transmitted such that the first data may be determined by the target device from a difference between the received signal strength indication (RSSI) of the first signal when received by the single receive antenna from the first transmit antenna and the RSSI of the first signal when received by the single receive antenna from the second transmit antenna.

E. The apparatus of any of the embodiments of A through D, further including a switch configured to electrically couple each of the first antenna and the second antenna to the transmitter under control of the processor.

F. The apparatus of any of the embodiments of A through E, further including an interface for controlling the operation of the apparatus.

G. The apparatus of any of the embodiments of A through F, the transmitter further comprises a first and a second transmitter, wherein the first transmitter is operatively coupled to the first antenna and the second transmitter is operatively coupled to the second antenna.

H. An apparatus for securely transferring first data comprising a plurality of bits to a target device, including a first antenna, a second antenna positioned a fixed distance of approximately a half of a wavelength of a first signal from the first antenna, a transmitter, and a processor configured to control the transmitter to transmit the first signal containing second data selectively from one of the first antenna and the second antenna based upon bit values of the first data. The difference in signal strength of the first signal at a single receiving antenna of the target device is detectable only when the single receiving antenna is within close proximity of the first and second antennae. The second data does not include the first data.

I. The apparatus of embodiment of H, further including a wand shaped housing for positioning the second antenna at the fixed distance from the first antenna.

J. The apparatus of any of the embodiments of H and I, the housing being shaped to indicate orientation of the first and second antennae to a user of the apparatus.

K. The apparatus of any of the embodiments of H through J, the transmitter including a first transmitter electrically coupled to the first antenna and a second transmitter electrically coupled to the second antenna, the processor selectively controlling one of the first and second transmitters to transmit the signal based upon values of bits of the first data.

L. The apparatus of any of the embodiments of H through K, the processor configured to determine proximity of the target device to the apparatus based upon a ratio of received signal strength indication (RSSI) for a second signal transmitted by the target device and received by both of the first and second antennae, the processor controlling the transmitter to transmit the first signal only when the target device is in line with and in close proximity to the first and second antennae to decode the first data.

M. The apparatus of any of the embodiments of H through L, the spacing and orientation of the first and second antennae ensuring that the first data is detectable within the first signal only when (a) an antenna of the target device is within a predefined proximity of the first and second antennae and (b) the antenna of the target device is positioned substantially in line with the first and second antennae such that the distance between the antenna of the target device and the first antenna is less than the distance between the antenna of the target device and the second antenna.

N. Apparatus for securely transferring first and second data to a target device using a single receiving antenna, the first data comprising encryption information, the apparatus including a first antenna, a second antenna positioned a fixed distance from the first antenna, at least one transmitter for transmitting a first wireless signal containing the second data, and a processor configured to switch the first wireless signal between the first antenna and the second antenna based upon bit values of the first data, wherein the second data is encoded independently of the coupling of the first data. A distance from the single receiving antenna to the first antenna is less than a distance from the single receiving antenna to the second antennas, resulting in a difference in signal strength of the first signal at the single receiving antenna of the target device that is detectable only when the single receiving antenna is within close proximity of the first and second antennae.

O. A system for securely transferring first data comprising a plurality of bits from a source device to a target device includes the source device, which includes a first antenna, a second antenna positioned a fixed distance from the first antenna, a transmitter, and a processor configured to control the transmitter to transmit a first signal containing second data, the processor causing the transmitter to switch between transmitting the first signal from one of the first antenna and the second antenna based upon bits of the first data. The system also includes the target device, which includes an antenna configured for receiving the first signal from the source device, a receiver electrically coupled with the antenna and configured to determine a received signal strength indicator (RSSI) of the first signal, and a processor configured to receive the RSSI of the first signal from the receiver and to determine the first data therefrom. The first data may only be received by the target device when the target device within close proximity of the first and second antennae. The second data does not include the first data. The target device determines when it is positioned within a back lobe of the source device when polarity of received data is inverted.

P. A method for securely transferring first data from a source device to a target device, including the step of transmitting a wireless signal having (a) a higher speed channel conveying second data and (b) a lower speed channel conveying the first data, wherein the lower speed channel is formed by selectively transmitting the wireless signal from one of a first and second antennae of the source device based upon the first data. The first and second antenna being positioned a fixed distance apart and the target device using a received signal strength indication (RSSI) of the first signal to decode the lower speed channel and receive the first data.

Q. The method of embodiment P, the fixed distance corresponding to approximately a half of a wavelength of the first signal.

R. The method of either of the embodiments P and Q, further including, before the step of transmitting, determining proximity of the target device to the source device based upon an RSSI ratio of a second signal received from the target device by each of the first and second antennae, wherein the step of transmitting is started when the RSSI ratio is greater than a predefined threshold that indicates that the target device is within sufficiently close proximity of the first and second antennae to decode the lower speed channel.

S. The method of any of the embodiments of P through R, the higher speed channel conveying the second data within data packets, where each data packet corresponds to one bit of the first data within the slower speed channel.
T. The method of any of the embodiments of P through S, further including sending a hash value of the first data within one of the data packets to allow the target device to determine whether part of the first data is incorrect or incomplete based upon the hash value.
U. The method of any of the embodiments of P through T, further including receiving, within a data packet transmitted by the target device, a request to retransmit the part of the first data that is incorrect and retransmitting at least the incorrect or incomplete part of the first data.
V The method of any of the embodiments of P through U, the target device flipping bits of received data until a hash of the received data matches the hash value.
W. The method of any of the embodiments of P through V, the first data including data copied from another device for pasting into the target device. The first data is copied from the other device using a copy portion of a copy and paste protocol, and then the first data is transferred to the target device using a paste portion of the copy and paste protocol.
X. The method of any of the embodiments of P through W, the first data corresponding to encryption of information within the second data.

What is claimed is:

1. An apparatus for securely transferring first data comprising a plurality of bits to a target device that uses a single receive antenna, the apparatus comprising:
   a first antenna;
   a second antenna positioned a fixed distance from the first antenna such that a received signal strength indicator (RSSI) for the first antenna measured at the target device will be different than an RSSI for the second antenna;
   a transmitter; and
   a processor configured to control the transmitter to transmit a first signal containing second data in packets, the processor causing the transmitter to transmit packets of the first signal with the first antenna and the second antenna by switching between the first and second antennas based upon bits of the first data; and
   wherein the second data does not include the first data and the target device receives the first data by detecting the RSSI of the transmitted packets of the first signal.
2. The apparatus of claim 1, wherein the fixed distance between the first and second antenna is approximately a half of a wavelength of the first signal.
3. The apparatus of claim 2, wherein a distance between the first antenna and the target device is less than a distance between the second antenna and the target device.
4. The apparatus of claim 2, wherein the first signal is transmitted such that the first data may be determined by the target device from a difference between the received signal strength indication (RSSI) of the first signal when received by the single receive antenna from the first transmit antenna and the RSSI of the first signal when received by the single receive antenna from the second transmit antenna.
5. The apparatus of claim 4, further comprising a switch configured to electrically couple each of the first antenna and the second antenna to the transmitter under control of the processor.
6. The apparatus of claim 1, further comprising an interface for controlling the operation of the apparatus.
7. The apparatus of claim 1, wherein the transmitter further comprises a first and a second transmitter, wherein the first transmitter is operatively coupled to the first antenna and the second transmitter is operatively coupled to the second antenna.
8. An apparatus for securely transferring first data comprising a plurality of bits to a target device, comprising:
   a first antenna;
   a second antenna positioned a fixed distance of approximately a half of a wavelength of a first signal from the first antenna;
   a transmitter; and
   a processor configured to control the transmitter to transmit the first signal containing packets of second data selectively from one of the first antenna and the second antenna based upon bit values of the first data;
   wherein a difference in signal strength of each packet of the first signal at a single receiving antenna of the target device is detectable only when the single receiving antenna is within close proximity of the first and second antennae; and
   wherein the second data does not include the first data and the target device receives the first data by detecting the difference in signal strength of each packet of the first signal.
9. The apparatus of claim 8, further comprising a wand shaped housing for positioning the second antenna at the fixed distance from the first antenna.
10. The apparatus of claim 9, wherein the housing is shaped to indicate orientation of the first and second antennae to a user of the apparatus.
11. The apparatus of claim 10, the transmitter comprising a first transmitter electrically coupled to the first antenna and a second transmitter electrically coupled to the second antenna, the processor selectively controlling one of the first and second transmitters to transmit the signal based upon values of bits of the first data.
12. The apparatus of claim 11, the processor configured to determine proximity of the target device to the apparatus based upon a ratio of received signal strength indication (RSSI) for a second signal transmitted by the target device and received by both of the first and second antennae, the processor controlling the transmitter to transmit the first signal only when the target device is in line with and in close proximity to the first and second antennae to decode the first data.
13. The apparatus of claim 12, wherein the spacing and orientation of the first and second antennae ensures that the first data is detectable within the first signal only when (a) an antenna of the target device is within a predefined proximity of the first and second antennae and (b) the antenna of the target device is positioned substantially in line with the first and second antennae such that the distance between the antenna of the target device and the first antenna is less than the distance between the antenna of the target device and the second antenna.
14. An apparatus for securely transferring first and second data to a target device using a single receiving antenna, the first data comprising encryption information, the apparatus comprising:
   a first antenna;
   a second antenna positioned a fixed distance from the first antenna;
   at least one transmitter for transmitting a first wireless signal containing the second data in packets; and
   a processor configured to switch the packets of the first wireless signal between the first antenna and the second antenna based upon bit values of the first data, wherein the second data is encoded independently of the first data;

wherein a distance from the single receiving antenna to the first antenna is less than a distance from the single receiving antenna to the second antennas, resulting in a difference in signal strength of the first signal at the single receiving antenna of the target device that is detectable only when the single receiving antenna is within close proximity of the first and second antennae and the target device receives the first data by detecting the difference in signal strength of each packet of the first signal.

15. A system for securely transferring first data comprising a plurality of bits from a source device to a target device, comprising:

the source device, comprising:
a first antenna;
a second antenna positioned a fixed distance from the first antenna;
a transmitter; and
a processor configured to control the transmitter to transmit a first signal containing second data in packets, the processor causing the transmitter to transmit each packet of the first signal from one of the first antenna and the second antenna by switching between the first and second antennas based upon bits of the first data;

the target device, comprising:
an antenna configured for receiving the first signal from the source device;
a receiver electrically coupled with the antenna and configured to determine a received signal strength indicator (RSSI) of each packet of the first signal; and
a processor configured to receive the RSSI of each packet of the first signal from the receiver and to determine the first data therefrom;

wherein the first data may only be received by the target device when the target device within close proximity of the first and second antennae;

wherein the second data does not include the first data; and wherein the target device determines when it is positioned within a back lobe of the source device when polarity of received data is inverted.

* * * * *